United States Patent Office 3,497,518
Patented Feb. 24, 1970

3,497,518
N-(1-ALKYL-4-PIPERIDYL)-AZABICYCLO-
OCTANES AND NONANES
Robert B. Moffett, Kalamazoo, Mich., assignor to The
Upjohn Company, Kalamazoo, Mich., a corporation of
Delaware
No Drawing. Filed Apr. 1, 1966, Ser. No. 539,306
Int. Cl. C07d 39/00, 41/00; A61k 27/00
U.S. Cl. 260—293                                    7 Claims

ABSTRACT OF THE DISCLOSURE

New N - (1 - alkyl-4-piperidyl)-azabicyclooctanes and
-nonanes have been prepared by heating, in the presence
of an acid catalyst and an inert organic medium, an azabi-
cyclooctane or -nonane with an N-alkylpiperidone to pro-
duce N - (1,2,3,6 - tetrahydro-1-alkyl-4-piperidyl)-azabi-
cyclooctanes and -nonanes which are catalytically reduced
to form the above-named products. These products are
active pharmacologically as CNS stimulants.

This invention pertains to new oranic compounds and
to a new process for preparing them. The invention is
more particularly directed to new N-(1-alkyl-4-piperidyl)-
azabicyclooctanes and -nonanes and acid addition salts
thereof, and to the new process which comprises condens-
ing an azabicyclooctane or -nonane with an N-alkyl-4-
piperidone by heating in the presence of an inert organic
solvent and an acid catalyst, and catalytically reducing
the thus prepared N - (1,2,3,6 - tetrahydro - 1 - alkyl - 4-
pyridyl)-azabicyclooctane or -nonane to obtain the cor-
responding N - (1 - alkyl-4-piperidyl)-azabicyclooctane or
-nonane of the formula

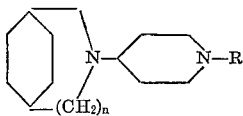

wherein $n$ is the integer 0 or 1 and R is methyl, ethyl,
propyl, isopropyl, sec-butyl, tert-butyl, isobutyl, or n-
butyl.

The novel N - (1 - alkyl-4-piperidyl)-azabicyclooctanes
and -nonanes of this invention (compounds according to
Formula I) are prepared according to known methods of
condensing a cyclic ketone with a secondary amine to ob-
tain the enamine product, and reducing the enamine.
[See Stork et al., J. Am. Chem. Soc. 85, pp. 207–222
(1963), and Blanchard, J. Org. Chem. 28, pp. 1397 and
1398 (1963)]. The particular secondary amines used in
the process of this invention are 2-azabicyclo[2.2.2]
octane as prepared by W. Schneider and R. Dillmann,
Chem. Ber. 96, 2377 (1963) and 3-azabicyclo[3.2.2]
nonane as described in Belgian Patent No. 608,905 and
more recently by V. L. Brown, Jr., and T. E. Stanin, Ind.
Eng. Chem., Prod. Res. & Dev. 4, pp. 40–47 (1965).
2-azabicyclo[2.2.2]octane has the formula:

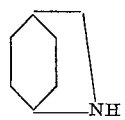

and 3-azabicyclo[3.2.2]nonane has the formula:

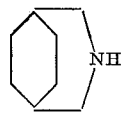

The particular cyclic ketones used in the process of this
invention are N-alkyl-4-piperidones having the structural
formula

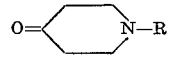

wherein R is as defined above.

According to the stoichiometry of the reaction, one
equivalent of an azabicyclooctane or -nonane is required
for each equivalent of the N-alkyl-4-piperidone. However,
more or less of either reactant can be used. Hence, for ex-
ample, one equivalent of 3-azabicyclo[3.2.2]nonane can
be reacted with slightly more than one equivalent of an
N-alkyl-4-piperidone, e.g., N-methyl-4-piperidone. On the
other hand, one equivalent of N-alkyl-4-piperidone can be
reacted with 1.5 to 2 equivalents of azabicyclooctane or
-nonane according to the reactions described by Stork
et al., supra.

Condensing an N-alkyl-4-piperidone and an azabicyclo-
octane or -nonane is effected by heating a mixture of the
reactants in an inert organic medium, for example, ben-
zene, toluene, or xylene, at temperatures ranging between
about 75° and about 150° C., preferably between about
100° and about 115° C. Advantageously, the reaction
mixture should contain a strong acid catalyst which will
promote the condensation. Hydrochloric acid can be used,
but it volatilizes too readily from the reaction mixture.
Sulfuric acid can be used also, but sulfonic acids such as
p-toluenesulfonic (most preferred), methanesulfonic, and
benzenesulfonic acid are preferred.

The reaction mixture is ordinarily heated at the reflux
temperature, using a water separator, for from about 5
to about 24 hrs. or until water separation ceases. The
N - (1,2,3,6 - tetrahydro - 1 - alkyl-4-pyridyl)-azabicyclo-
octane or -nonane produced can be recovered from the
reaction mixture by fractional distillation under reduced
pressure. Preferably, the reaction mixture containing the
N - (1,2,3,6 - tetrahydro - 1 - alkyl-4-pyridyl)-azabicyclo-
octane or -nonane is used in the reduction step without
recovering or purifying the enamine. The enamine tends
to be unstable, particularly in the presence of water; and,
unless used soon after preparation, it is good practice to
store enamines in the cold under nitrogen.

N-(1,2,3,6-tetrahydro-1-alkyl-4-pyridyl) - azabicyclo-
octanes and -nonanes are converted into the novel N-(1-
alkyl-4-piperidyl)-azabicyclooctanes and -nonanes of this
invention (compounds according to Formula I) by re-
ducing the double bond of the N-(1,2,3,6-tetrahydro-1-
alkly-4-pyridyl) group according to conventional meth-
ods for reducing carbon to carbon double bonds. Reduc-
tion can be accomplished, for example, using hydrogen
in the presence of a metal catalyst. Advantageously, the
reduction is effected with hydrogen in the presence of a
noble metal catalyst, for example platinum, palladium,
rhodium and the like; although base metal catalysts can
be used, for example, Raney nickel, Raney cobalt, and
the like can be used.

In general, satisfactory hydrogenations are accom-
plished using the following conditions: (1) hydrogen
gas under about 15 lbs. to about 50 to 60 lbs. pressure,
(2) the catalyst (preferably platinum oxide), (3) tem-
peratures in the range of about 10° C. to about 100° C.
(preferably about 25° C.), and (4) a solvent. Represen-
tative solvents include ethanol, methanol, isopropyl alco-
hol, glacial acetic acid, ethyl acetate, diethyl ether,
dioxane, and the like. In general, the hydrogenation
proceeds readily and is essentially completed in about
15 mins. to about 2 hrs. when, for example, platinum
oxide catalyst, hydrogen pressures of about 45 to 60 lbs.,
and a temperature of about 25° C. are employed.

The N - (1-alkyl-4-piperidyl) - azabicyclooctane or
-nonane product is recovered from the hydrogenation reaction mixture by conventional methods, e.g., filtration to remove the catalysts, and removal of solvent by evaporation or distillation. The product can be isolated in pure form by distillation, crystallization from a suitable solvent, e.g., pentane; by partition between two immiscible solvents; by chromatography; or by a combination of these purification techniques.

The novel N - (1-alkyl-4-piperidyl)-azabicyclooctanes and -nonanes according to this invention (Formula I) can also be prepared by reductive amination of an N-alkyl - 4 - piperidone (Formula II) according to the Leuckart reaction. The reductive amination is accomplished in general by slowly adding the amine (3-azabicyclo[3.2.2]nonane or 2-azabicyclo[2.2.2]octane) to a quantity of 98+% formic acid in a round bottom flask while cooling the flask and contents in flowing tap water. While the mixture of formic acid and amine is still warm, the N-alkyl-4 - piperidone is added. The reaction mixture is then heated at the reflux temperature, while advantageously controlling the generation of carbon dioxide gas with, for example, glass beads. After the reaction is completed and the reaction mixture has been cooled, any unreacted N-alkyl-4-piperidone is removed by diluting the reaction mixture with water, acidifying the aqueous mixture with hydrochloric acid, and extraction with several volumes of ether. After removing any dissolved ether from the ether-extracted, aqueous acid solution by boiling, the solution is heated at the reflux temperature for from 1 to 4 hrs. in order to hydrolyze any formates present. The desired N-(1-alkyl-4-piperidyl)-azabicyclooctane or -nonane product might sometimes separate as the hydrochloride salt on concentrating and cooling; otherwise the cooled, refluxed, aqueous solution is made basic with about 50% alkali metal hydroxide, e.g., sodium hydroxide, and the free base N-(1-alkyl-4-piperidyl)-azabicyclooctane or -nonane extracted with, e.g., diethyl ether. The compound is recovered and purified by conventional methods of washing the ether solution, drying, removing the ether by evaporation, and distillation, or recrystallizing the compound from a solvent, e.g., pentane.

The novel free base N-(1-alkyl-4-piperidyl)-azabicyclooctanes and -nonanes (Formula I) of this invention form acid addition salts with acids. The novel acid addition salts of the invention are prepared by neutralizing the free base compounds with an acid according to conventional methods. For example, the compounds can be treated with at least a stoichiometric amount of the appropriate acid; and depending upon the nature of the solvent employed, the desired salt will separate spontaneously or can be precipitated by the addition of a solvent in which the salt is insoluble. Acid addition salts can also be prepared metathetically by reacting an acid addition salt of this invention with an acid which is stronger than the acid comprising the acid moiety of the starting salt. Pharmacologically acceptable acid addition salts can be prepared using acids such as sulfuric, hydrochloric, hydrobromic, nitric, phosphoric, benzoic, p-toluenesulfonic, salicylic, acetic, propionic, pamoic, tartaric, citric, succinic acids, and the like. Similarly, acid addition salts can be prepared with acids such as fluosilicic acid, picric acid, thiocyanic acid, and the like.

The amine-fluosilicate salts prepared by neutralizing the free base compounds with fluosilicic acid are according to U.S. Patents No. 1,915,344 and No. 2,075,359 useful as mothproofing agents. The thiocyanate salts prepared by neutralizing the free base compounds with thiocyanic acid can be condensed with formaldehyde in accordance with U.S. Patents No. 2,425,320 and No. 2,606,155 to form amine thiocyanate-formaldehyde condensation products for use as pickling inhibitors. All of the acid addition salts of this invention are useful in the purifiication of the free bases.

The novel N - (1-alkyl-4-piperidyl)-azabicyclooctanes and -nonanes of Formula I are useful organic chemicals. The compounds are active as central nervous system stimulants and can be used to make mammals, birds, and other animals more alert and responsive to their environment. They can be used to alleviate mental depression. The novel N - (1 - alkyl-4-piperidyl)-azabicyclooctanes and -nonanes of this invention are enzyme inhibitors and inhibit the action of pseudocholinesterase.

The valuable pharmacologic properties of the novel N-(1-alkyl-4-piperidyl)-azabicyclooctanes and -nonanes of this invention are realized by administering the compounds or their pharmacologically acceptable acid addition salts to mammals, birds, and other animals in either oral or parenteral compositions.

For oral administration N-(1-alkyl-4-piperidyl)-azabicyclooctanes and -nonanes and their pharmacologically acceptable acid addition salts can be formulated with a pharmaceutical carrier to give solid or fluid unit dosage forms.

Suitable solid forms include tablets, pills, capsules, granules, powders, suppositories, and the like. Advantageously, the pharmaceutical carrier for such solid forms include corn starch, lactose, dicalcium phosphate, terra alba (calcium sulfate), talc, stearic acid, magnesium stearate, and gums. Suitable fluid forms include solutions, suspensions, syrups, and emulsions. Advantageously, the pharmaceutical carrier for such fluid forms comprise water, oils, and water-oil emulsions. If desired, suitable dispersing or suspending agents can be included, for example, tragacanth, acacia, alginates, dextran, sodium carboxymethylcellulose, methylcellulose, polyvinylpyrrolidone, gelatin, and mixtures thereof. Suitable oils for solutions and water-oil emulsions include cottonseed oil, sesame oil, coconut oil, and peanut oil.

For parenteral administration, N-(1-alkyl-4-piperidyl)-azabicyclooctanes and -nonanes and their pharmacologically acceptable acid addition salts can be formulated in dilute aqueous solutions, aqueous suspensions, and oil dispersions for intramuscular injection, intravenous drip, vascular perfusion, or like routes. Advantageously, a solubilizer, for example, N,N-dimethylacetamide (preferred), N,N-dimethylformamide, ethanol, and the like can be utilized. If desired, other aqueous media such as water for injection, normal saline solution, Ringer's solution, blood plasma, and whole blood can be used.

Compositions of N-(1-alkyl-4-piperidyl)-azabicyclooctanes and -nonanes and their pharmacologically acceptable acid addition salts for topical applications include powders (preferred), ointments, creams, pastes, jellies, and the like. Such compositions of the essential active ingredient can include emulsifying agents, solvents, antioxidants, preservatives, buffers, and bodying materials.

The following examples are illustrative of the process and products of the present invention, but are not to be construed as limiting.

EXAMPLE 1

Preparation of N-(1-methyl-4-piperidyl)-3-azabicyclo-[3.2.2]nonane and dihydrochloride Part A.—A solution consisting of 56.6 gm. (0.5 mole) N-methyl-4-piperidone, 65 gm. (0.52 mole) 3-azabicyclo-[3.2.2]nonane, 1 gm. p-toluenesulfonic acid, and 200 ml. toluene was heated at the reflux temperature for 18 hrs. During that time, 8.5 ml. water was collected in a trap. The toluene was then removed by evaporation under reduced pressure, and the residue thus obtained was dissolved in 100 ml. ethanol. The ethanol solution was subjected to hydrogen at an initial pressure of 60 p.s.i. and about 25° C. in the presence of 0.5 gm. platinum oxide. After about 2 hrs., one-half the theoretical amount of hydrogen had been used. Addition of more catalyst did not promote further hydrogenation, and after 7 hrs. the ethanol solution was filtered to remove any solids. The ethanol was removed by evaporation under reduced pressure to give a brown oil. The oil was mixed with 255.5 gm. (1 mole) p-bromobenzenesulfonyl chloride, the mixture was basified with 160 gm. 50% aqueous sodium hydroxide, and the basified mixture was diluted with 200 ml. water. After heating the mixture on a steam bath with vigorous stirring for 15 min., it was cooled and filtered. The solid material on the filter was thoroughly extracted first with water and then with ether. The combined original filtrate and water and ether washes were separated and the aqueous portion was extracted twice with ether and discarded. The combined ether portion and the two ether extracts was extracted twice with dilute aqueous hydrochloric acid. The combined dilute aqueous acid extracts was washed with ether and then basified with sodium hydroxide. The basified solution was extracted two times with ether, the combined ether extracts was washed first with water, and then with a saturated aqueous solution of sodium chloride. After drying over anhydrous potassium carbonate, the ether solution was filtered to remove the dessicant. The ether was removed by evaporation, and the oil that remained was distilled two times through a short, helices-packed column. There was thus obtained 33.8 gm. yield, (30.4 percent of theory) of N-(1-methyl-4-piperidyl) - 3 - azabicyclo[3.2.2]nonane which solidified in the receiver. The compound had a melting point of 42° to 47° C. and a boiling point at 162° to 165° C. and 11 mm. of mercury pressure.

*Analysis.*—Calc'd for $C_{14}H_{26}N_2$: C, 75.62; H, 11.79; N, 12.60. Found: C, 75.81; H, 12.06; N, 12.11.

Part B.—The dihydrochloride was prepared by dissolving the free base in 100 ml. 95% aqueous ethanol and acidifying with hydrogen chloride in ethanol. The white precipitate that formed was dissolved by heating the mixture to boiling and adding 750 ml. of the 95% aqueous ethanol and 25 ml. water. Upon cooling, N-(1-methyl-4-piperidyl) - 3 - azabicyclo[3.2.2]nonane dihydrochloride crystallized as silky needles. The crystals were collected on a filter, washed with ethanol and dried. The compound as a white solid melted at 348° to 350° C. (with decomposition). The yield was 28.36 gm. (66 percent).

*Analysis.*—Calc'd for $C_{14}H_{28}Cl_2N_2$: C, 56.94; H, 9.56; Cl, 24.01; N, 9.49. Found: C, 57.18; H, 9.54; Cl, 24.19; N, 9.85.

EXAMPLE 2

Following the same procedure as Example 1 above, but substituting 2-azabicyclo[2.2.2]octane [prepared according to Schneider and Dillmann, Chem. Ber. 96, p. 2377 (1963)] for 3-azabicyclo[3.2.2]nonane, there can be prepared N-(1-methyl-4-piperidyl)-2-azabicyclo[2.2.2]octane and the dihydrochloride thereof.

EXAMPLE 3

Following the same procedure as Example 1, above, but substituting N-ethyl-4-piperidone, N-propyl-4-piperidone, N-butyl-4-piperidone, and N-sec-butyl-4-piperidone for N-methyl-4-piperidone, there can be prepared N-(1-ethyl-4-piperidyl)-3-azabicyclo[3.2.2]nonane and dihydrochloride, N-(1-propyl-4-piperidyl)-3-azabicyclo[3.2.2]nonane and dihydrochloride, N-(1-n-butyl-4-piperidyl)-3-azabicyclo[3.2.2]nonane and dihydrochloride, and N-(1-sec-butyl-4-piperidyl)-3-azabicyclo[3.2.2]nonane and dihydrochloride, respectively.

EXAMPLE 4

Following the same procedure as Example 1, Part B, but substituting acetic, phosphoric, sulfuric, hydrobromic, nitric benzoic, p-toluenesulfonic, salicylic, propionic, pamoic, tartaric, citric, succinic, fluosilicic, and thiocyanic acids for hydrochloric acid, there can be prepared the diacetate, the phosphate, sulfate, dihydrobromide, nitrate, dibenzoate, di-p-toluenesulfonate, disalicylate, dipropionate, dipamoate, tartrate, citrate, succinate, fluosilicate, and dithiocyanate, respectively, of N-(1-methyl-4-piperidyl)-3-azabicyclo[3.2.2]nonane.

Following the same procedure as Example 1, Part B, but substituting for N-(1-methyl-4-piperidyl)-3-azabicyclo[3.2.2]nonane the N-(1-methyl-4-piperidyl)-2-azabicyclo[2.2.2]octane of Example 2 and the N-(1-ethyl-4-piperidyl) - 3 - azabicyclo[3.2.2]nonane, N-(1-propyl-4-piperidyl)-3-azabicyclo[3.2.2]nonane, N - (1-n-butyl-4-piperidyl)-3-azabicyclo[3.2.2]nonane, N - (1-sec-butyl-4-piperidyl)-3-azabicyclo[3.2.2]nonane, and including acetic, phosphoric, sulfuric, hydrobromic, nitric, benzoic, p-toluenesulfonic, salicyclic, propionic, pamoic, tartaric, citric, succinic, fluosilicic, and thioyanic acids, as well as hydrohloric acid, there can be prepared the corresponding acid addition salts.

I claim:

1. A member selected from the group consisting of N-(1-alkyl-4-piperidyl)-azabicyclooctanes or -nonanes of the formula

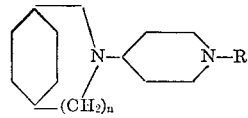

wherein $n$ is the integer 0 or 1; and R is methyl, ethyl, propyl, isopropyl, sec-butyl, tert butyl, isobutyl, or n-butyl and acid addition salts thereof.

2. N-(1-alkyl-4-piperidyl) - 3 - azabicyclo[3.2.2.]nonane according to claim 1 wherein $n$ is 1.

3. N-(1-methyl-4-piperidyl) - 3 - azabicyclo[3.2.2]nonane according to claim 2.

4. Acid addition salts of N-(1-alkyl-4-piperidyl)-azabicyclooctanes and -nonanes according to claim 1.

5. Dihydrochloride of N - (1-alkyl-4-piperidyl)-azabicyclooctanes and -nonanes according to claim 1.

6. N-(1-alkyl-4-piperidyl) - 3 - azabicyclo[3.2.2]nonane dihydrochloride according to claim 5 wherein $n$ is 1.

7. N-(1-mehtyl-4-piperidyl) - 3 - azabicyclo[3.2.2]nonane dihydrochloride according to claim 6.

References Cited

UNITED STATES PATENTS 3,154,554  10/1964  Seeger et al. _____ 260—293

OTHER REFERENCES

Stork et al. J. Am. Chem. Soc. 85 pp. 207–216 (1963).
Nazarov et al., Zhur. Obshcheĭ Khim. 29, 2609–13 (1959). C.A. 54:11012i supplied.

HENRY R. JILES, Primary Examiner

G. T. TODD, Assistant Examiner

U.S. Cl. X.R.

260—293.2, 294, 999